(12) United States Patent
Fattouch et al.

(10) Patent No.: US 7,328,023 B2
(45) Date of Patent: Feb. 5, 2008

(54) PROCESS AND SYSTEM FOR DEPLOYMENT OF RADIO COVERAGE OF A CELLULAR RADIOTELEPHONY NETWORK

(75) Inventors: Imad Fattouch, Paris (FR); Soudabeh Serre, Carrieres sur Seine (FR); Francois Vincent, Clamart (FR)

(73) Assignee: Societe Francaise du Radiotelephone, Paris (FR)

( * ) Notice: Subject to any disclaimer, the term of this patent is extended or adjusted under 35 U.S.C. 154(b) by 833 days.

(21) Appl. No.: 10/391,159

(22) Filed: Mar. 18, 2003

(65) Prior Publication Data
US 2003/0220774 A1  Nov. 27, 2003

(30) Foreign Application Priority Data
Mar. 19, 2002 (FR) .................................. 02 03487

(51) Int. Cl.
*H04Q 7/36* (2006.01)
(52) U.S. Cl. ...................................... 455/446
(58) Field of Classification Search ................ 455/446; 703/2
See application file for complete search history.

(56) References Cited

U.S. PATENT DOCUMENTS

| | | | | |
|---|---|---|---|---|
| 5,561,841 | A | * 10/1996 | Markus ....................... | 455/446 |
| 5,963,867 | A | * 10/1999 | Reynolds et al. ............ | 455/457 |
| 6,094,580 | A |   7/2000 | Yu et al. ..................... | 455/446 |
| 6,336,035 | B1 | * 1/2002 | Somoza et al. .............. | 455/446 |
| 2001/0051503 | A1 | 12/2001 | Lush ........................ | 455/2.01 |

FOREIGN PATENT DOCUMENTS

| | | |
|---|---|---|
| FR | 01 10724 | 10/2001 |
| WO | WO 94/03986 | 2/1994 |
| WO | WO 94/03992 | 2/1994 |

OTHER PUBLICATIONS

"DEMON: A Forecasting Tool For Demand Evaluation Of Mobile Network Resources", Grasso et al., CSELT Technical Reports, vol. 25, No. 2, pp. 257-266.
"Cellular Network Strategic Planning Methods In A Service Profitability Analysis Perspective", Donatelli et al., Universal Personal Communications, 1998, pp. 275-279.

* cited by examiner

*Primary Examiner*—Harry S. Hong
(74) *Attorney, Agent, or Firm*—Perman & Green, LLP

(57) ABSTRACT

A modeling process for the deployment of the radio coverage of a cellular radiotelephony network, using a computer system that memorizes data representing reference coverage maps of the network, data representing geographic maps broken down into area delimited by a contour, called geomarketing data, data representing at least on type of radio station, data representing a sufficient coverage threshold and data representing a coverage threshold of each contour, the modeling process comprising selecting a geographic map, retrieving geomarketing data and data representing the corresponding reference coverage map, producing a regular grid with a determined spacing showing potential sites representing radio electric stations to be added inside the contour, using calculation functions of the computer and selecting or eliminating potential sites as a function of at least one criterion related to their usefulness.

13 Claims, 3 Drawing Sheets

Figure 1:
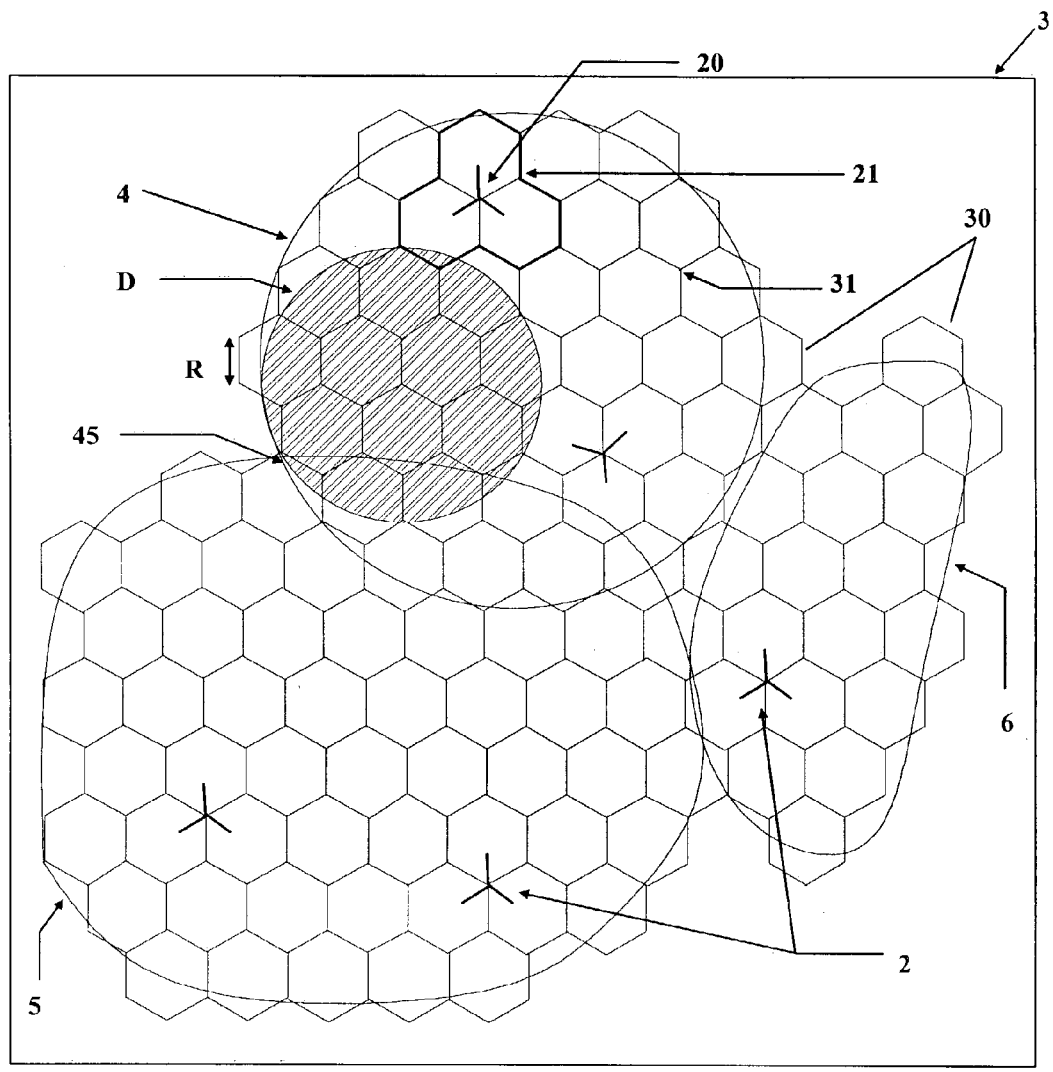

PROCESS AND SYSTEM FOR DEPLOYMENT OF RADIO COVERAGE OF A CELLULAR RADIOTELEPHONY NETWORK

The present invention relates to cellular radiotelephony networks and more particularly for improvement of the radio coverage in a network managed by an operator, a modelling process and a computer system designed for deployment of the said radio coverage of the said network.

A cellular radiotelephony network is composed of several land radio-electric base stations that provide radio coverage of areas defining respective cells. The terminal and station receiver circuits need to receive signals above their sensitivity threshold, in order to set up communications between mobile radio terminals moving about within the area occupied by a cell and the station.

Within the framework of the communication service offer for mobile terminals, a radio operator must respect the coverage ratio to which he is committed (proportion of the country, percentage of the population, etc.) if he wants to obtain and keep his operator license, and not make things too easy for his competitors. Patent application FR 01 10724 issued by the same applicant relates to a statistical calculation of the coverage ratio and is the standard in this subject, and is mentioned as a reference in this patent. Consequently, he can use prediction tools and elevation, demographic, land occupancy and demography type mapping databases to optimize the location of his infrastructures and the sizing of his equipment. This work is usually done by radio engineering assisted by propagation calculation tools, and makes use of propagation studies to determine the theoretical coverage of a network.

In prior art, the definition of potential sites to be deployed for a cellular radiotelephony network was tedious for radio engineers. This work to optimise the network coverage complies with marketing specifications that sometimes change and it is possible that planning studies for new sites that would last for several months need to be modified or abandoned. Medium term planning for sites to be deployed raises a duration and workload problem for the operator.

Therefore, the purpose of this invention is to eliminate one or more of the disadvantages according to prior art by defining a modelling process for deployment of the radio coverage of a network that can take account of specific marketing features, and can be used to define the locations of radio-electric stations to be installed on a geographic map.

Consequently, the invention relates to a modelling process designed for deployment of the radio coverage of a cellular radiotelephony network, using a computer system that memorises data representing initial radio coverage maps or reference coverage maps of the said cellular radiotelephony network, data representing geographic maps broken down into areas delimited by a contour, called geomarketing data, data representing at least one type of radio station, data representing a sufficient coverage threshold and data representing a coverage threshold of each contour, process characterised in that it initially comprises the following successive steps:

selection of a geographic map by interactive means between the user and the said system, retrieval of geomarketing data and data representing the reference coverage map corresponding to the selected geographic map, followed by processing of each contour in turn, using a program executed by the said computer system, this processing taking place as follows:

if the current coverage is below the contour coverage sufficiency threshold, production of a regular grid with a determined spacing showing potential sites representing radio electric stations to be added inside the contour using calculation means of the said computer system, and particularly using data representing the selected geographic map, each site being separated from others by at least a determined distance, selection or elimination of potential sites by the said program as a function of at least one criterion related to their usefulness, said computer system using memorised data from a radio propagation attenuation law, data about the type of radio station used and making use of these data to simulate the radio coverage generated by an added site.

According to another specific feature of the invention, the said selection or elimination of potential sites is done using the following steps:

for each potential site of the said regular grid, comparison between firstly the reference coverage in a disk with a radius equal to the said determined distance and centred on the potential site, and also the coverage sufficiency threshold, and conservation of this site among the potential sites if the coverage sufficiency threshold is not reached in the said disk, calculate the radio coverage for each potential site, take each site one by one, and calculate the overlap ratios between sites and the reference coverage, individually add sites that make the greatest contribution to the total coverage, as long as adding the site does not bring the coverage to a level greater than the said coverage threshold fixed for the contour.

According to another specific feature of the invention, the said process comprises a step for the definition of several contour classes and grid spacing classes by memory means in the said computer system, the classes being hierarchised, each contour class being assigned a grid spacing with a value that becomes smaller as the class gets higher in the hierarchy.

According to another feature, the said successive processing of each contour is done in an order determined by the classes hierarchy, the contours in the highest class being processed first, and the contours in the lowest class being processed last.

According to another feature, the said process comprises a step to input the following parameters in at least one configuration file:

file name for the said geographic map, file name for the marketing specifications, reference coverage file name, first six-digit number of the site starting from which potential site numbers are incremented, minimum coverage ratio for zones that do not correspond to traffic routes, minimum coverage ratio for zones that correspond to traffic routes, coverage sufficiency threshold, value corresponding to the target field level fixed by the operator for each contour class, value of the minimum grid spacing for each contour class, parameters related to the radio station and antenna type used.

According to another feature, the said parameters related to the type of radio station and antenna used include particularly:

the antenna height used for the radio station, the name of the antenna used, the power at the emission rack output, expressed in dBW, for the antenna used, the antenna emission attenuation, losses between the emission rack and the antenna expressed in dB.

Another purpose of the invention is to provide a solution to one or several problems encountered in prior art by defining a computer system for planning new sites to be deployed, specially adapted to the process according to the invention, to improve the radio coverage of a cellular radiotelephony network.

This purpose is achieved by a computer modelling system that will be used for deployment of radio coverage of a cellular radiotelephony network with data representing initial radio coverage maps or reference coverage maps of the said cellular radiotelephony network, data representing geographic maps broken down into areas delimited by a contour, called geomarketing data, interactive means that the user can use to fix data related to at least one type of radio station in advance, to a coverage sufficiency threshold and to a coverage threshold within each contour, this computer system characterised in that it comprises:

means of selecting a geographic map, retrieving geomarketing data and data representing the reference coverage map corresponding to the selected geographic map, a module, particularly using data representing the selected geographic map making a regular grid with a determined spacing of potential sites representing radioelectric stations to be added inside the contour, each site being separated from another site by at least a determined distance, comparison means for each potential site in the said regular grid, between firstly the reference coverage in the disk with a radius equal to at least the said determined distance and centred on the site, and secondly the coverage sufficiency threshold enabling the system to keep this site among the potential sites if the coverage sufficiency threshold is not reached in the said disk, means of representing coverages of the kept potential sites, of memorising data corresponding to these new coverages and means of defining the new coverage in the contour, calculation means, taking the sites one by one, to calculate the share of the contribution of different sites to the coverage of the contour, means of individually adding potential sites making the largest contribution to the total coverage, as long as adding a site does not bring the coverage to a level greater than the said coverage threshold fixed for the contour, and in that it contains memorised data from a radio propagation attenuation law and data about the type of radio station used, and uses these data to simulate the radio coverage generated by the creation of a site.

According to another feature, the system according to the invention comprises memorisation means and means of taking account of several contour classes and grid spacings, the classes being hierarchised, each contour class being assigned a grid spacing with a value that becomes smaller as the class gets higher in the hierarchy.

According to another feature, the system according to the invention is provided with means of preselecting contours as a function of their class, particularly enabling the system to follow an order set up by the hierarchy of the said classes for processing of contours, the contours in the highest class being processed first and the contours for the lowest class being processed last.

According to another feature of the invention, the said contours are divided particularly into two categories:

contours of a first category including transport routes, that form long thin polygons, other contours belonging to a second category that form polygons.

According to another feature, the said regular grid of a contour is hexagonal, each potential site containing three sectors and being located at the intersection of three regular hexagons for contours in the said second category.

According to another feature, the regular grid is generated by means of bi-sectorial sites that are oriented along the direction of the transport route for contours in the said first category.

According to another feature, the system according to the invention comprises memorisation means and means of using at least one file containing geomarketing data, at least one file containing the reference coverage, and at least one configuration file including all input parameters entered by the user.

Figure 2:
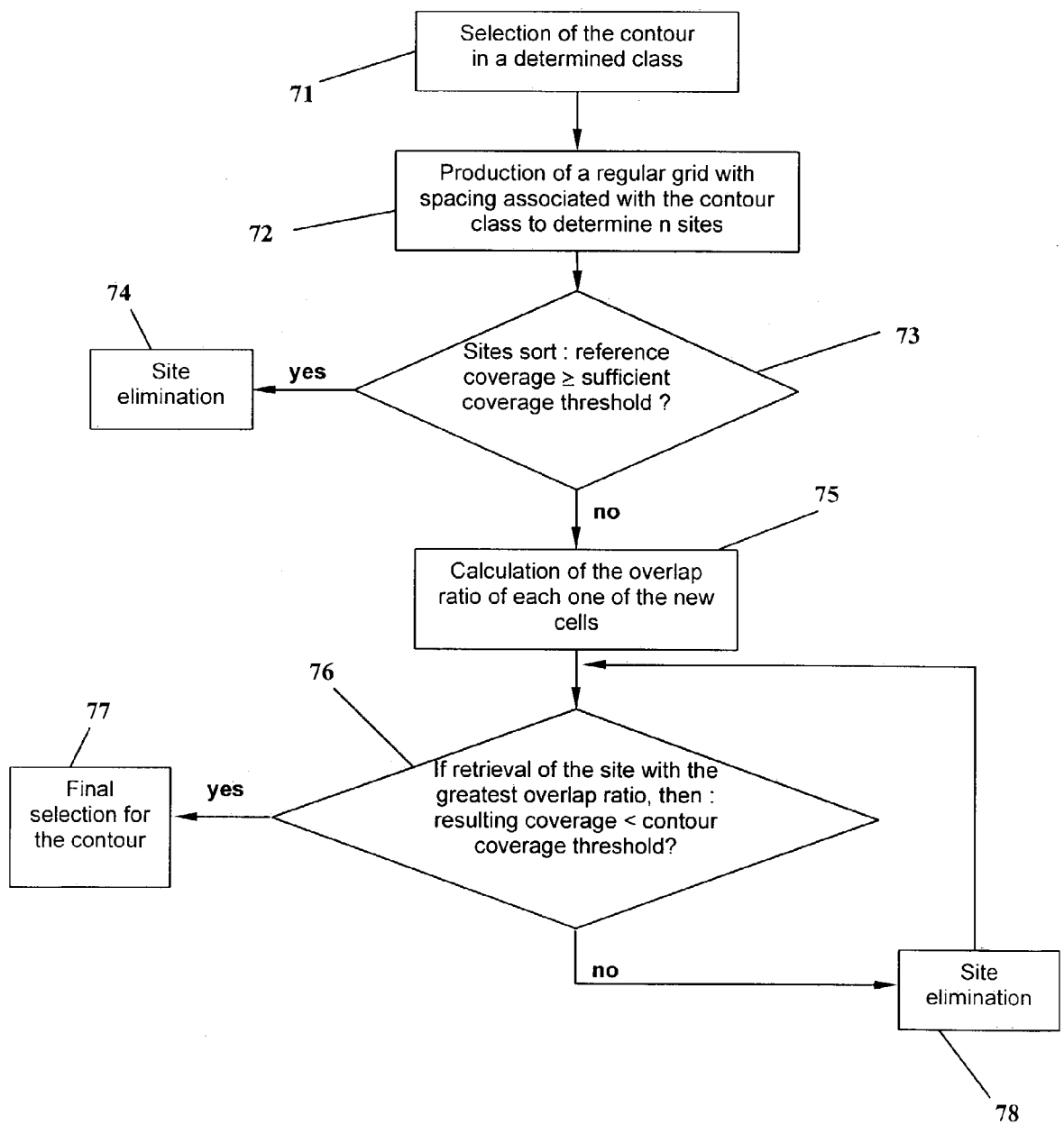
Figure 3:
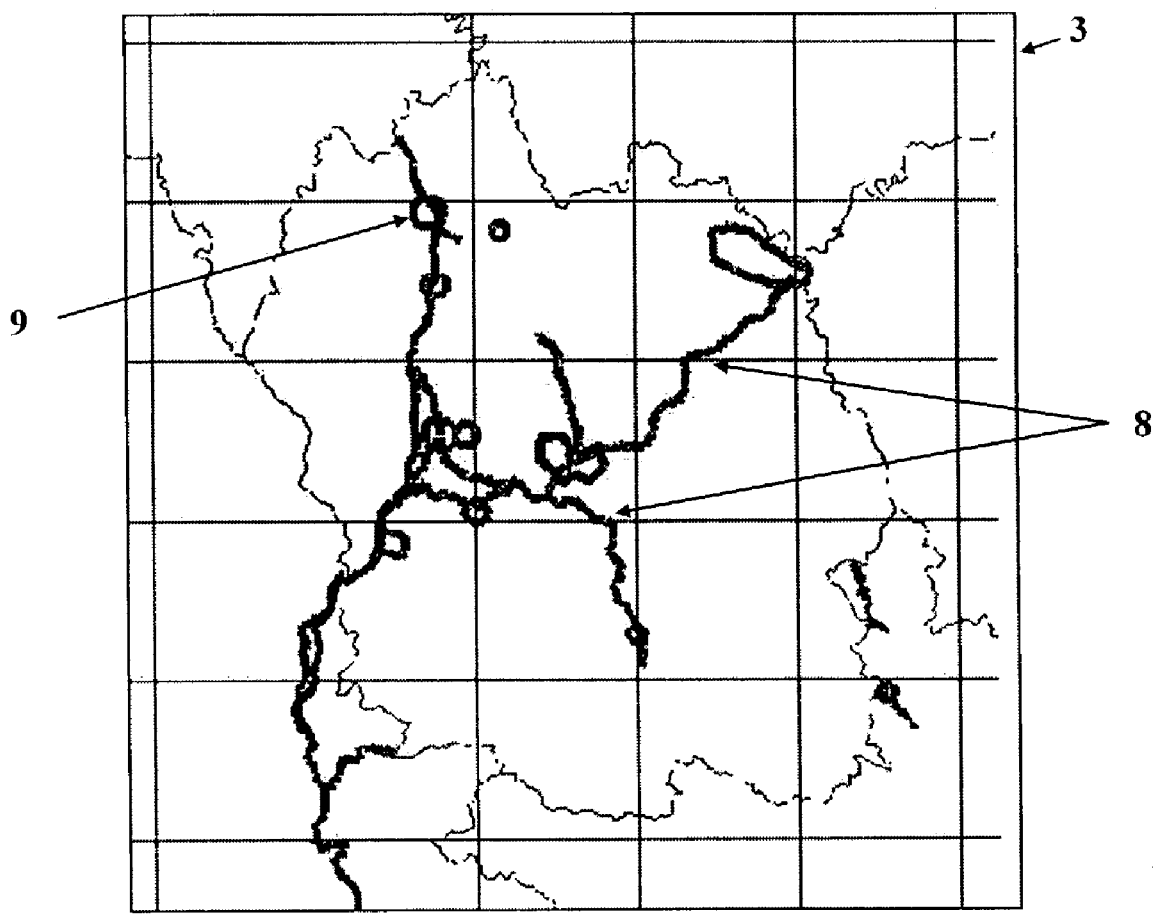

The invention and its characteristics and advantages will become clearer after reading the description made with reference to the attached drawings given as non-limitative examples in which:

FIG. 1 diagrammatically shows a geographic map showing part of a cellular radiotelephony network to which the process according to the invention was applied, FIG. 2 shows the site validation process for a contour, FIG. 3 shows a geographic map with surfaces and traffic routes that correspond to marketing specifications.

FIG. 1 shows a map (3) of a geographic area of a cellular radiotelephony network being improved, displayed on a display device of a computer system (100). As shown, the contours (4 to 6) may overlap onto each other, the contour (4) having an edge area (45) common with the contour (5). As will be understood, the overlap between contours (4 to 6) is only one special case within the scope of the invention.

The map (3) is a view of the data in a digital map stored in a database (10) of a memory (1) of the computer system (100), containing different files and databases not shown in FIG. 1. This figure does not show details of the calculation processing means or the system unit, or the memorisation, data input and display means by a keyboard and/or an interactive display screen with a mouse or other means. In particular, the digital map specifies natural and artificial relief and the nature of the relief such as forests, buildings or others, so that an estimate of the radio attenuation of the link affected by the relief can be calculated.

The operator of the network to be improved would like to add land radio-electric stations (2) according to specifications related to marketing that he defined in previous steps. He does this by memorising files in the database (10) containing geomarketing data, and files containing the reference coverage. The geomarketing data may comprise firstly data about a geographic breakdown and secondly data about marketing specifications. All previously recorded data are used to produce the initial radio coverage of the network or the reference coverage and thus to obtain a map (3) as shown in FIG. 1, with contours (4 to 6) defined by marketing. A target field level must also be fixed within these contours (4 to 6). The coverage ratio calculated in a contour is obtained by using the statistical calculation method for a coverage ratio presented in patent application FR 01 10724.

According to one preferred embodiment, operation of the invention requires firstly that several input parameters are entered into a configuration file (11) described in detail in the appendix. In order for the computer system (100) to take account of some files memorised in the database (10), parameters such as the file name related to the said geographic map (3), the file name related to the marketing specifications, the name and possibly the path of the reference coverage file, must be input. At least one minimum coverage ratio required inside a contour must also be entered as a parameter. Non-limitatively, it would even be possible to provide two minimum coverage ratios; a first for areas that correspond to traffic routes (8), for example roads, and a second for areas that do not correspond to traffic routes (8), called surface areas (9). Another parameter to be input is the coverage sufficiency threshold that acts as a reference to select potential sites (31) at a location at which the initial coverage is too low. The value corresponding to the target field level and the value corresponding to the minimum grid spacing (72) fixed by the operator for a contour, are additional parameters to be input in the said configuration file (11). The minimum grid spacing (72) is input in the form of a radius (R) expressed in meters as illustrated in the appendix. Since each contour belongs to a contour class defined by marketing, the operator provides different values of the target field level, A++, A+, A and B according to the non-limitative example given in the appendix, to make a difference between the requirement levels for the different contour classes. A++ may thus correspond to a sufficiently high field level to be able to telephone with a mobile radio terminal inside a building. In one illustrative case for which the operator might have provided three target field levels for twenty-seven classes, he would need to input one of three levels for each of the twenty-seven classes, and thus collect the contours (4 to 6) into three groups, the marketing advantage being the greatest in the group for which the target field level is the highest. Similarly, the operator may provide different values of the grid spacing (72), the minimum spacing being smaller, for example fixed at 400 meters for the configuration file (11) given in the appendix, for a high marketing advantage. Other parameters, particularly related to the type of radio station (2) and antenna used, such as the height and name of the antenna, the emission rack output power, the emission attenuation and losses between the emission rack and the antenna, must be input in the configuration file (11).

The following table illustrates one possible classification of contours delimiting different natures of the geographic entities. These entities are defined with an order of priority as a function of their marketing advantage.

| Marketing class | Priority order used | Geographic entity |
|---|---|---|
| 1 | 1 | Built-up areas > 500 000 inh./km$^2$ |
| 2 | 17 | Inner ring |
| 3 | 2 | Built-up areas > 10 000 inh./km$^2$ in inner rings |
| 4 | 3 | Built-up areas and villages > 2 000 inh./km$^2$ in inner rings |
| 5 | 4 | Built-up areas > 200 000 inh./km$^2$ |
| 6 | 18 | Inner ring |
| 7 | 5 | Built-up areas > 10 000 inh./km$^2$ in inner rings |
| 8 | 6 | Built-up areas and villages >2 000 inh./km$^2$ in inner rings |
| 9 | 7 | Built-up areas > 100 000 inh./km$^2$ |
| 10 | 19 | Inner ring |

-continued

| Marketing class | Priority order used | Geographic entity |
|---|---|---|
| 11 | 8 | Built-up areas >10 000 inh./km$^2$ in inner rings |
| 12 | 9 | Built-up areas and villages > 2 000 inh./km$^2$ in Inner rings |
| 13 | 10 | Built-up areas > 50 000 inh./km$^2$ |
| 14 | 20 | Inner ring |
| 15 | 11 | Built-up areas > 10 000 inh./km$^2$ in inner rings |
| 16 | 12 | Built-up areas and villages > 2 000 inh./km$^2$ in inner rings |
| 17 | 13 | Built-up areas > 20 000 inh./km$^2$ |
| 18 | 14 | Built-up areas > 10 000 inh./km$^2$ |
| 19 | 16 | Residential areas > 500 secondary homes |
| 20 | 15 | Built-up areas and villages > 2 000 inh./km$^2$ |
| 21 | 21 | Traffic routes > 8000 cars/day |
| 22 | 22 | Traffic routes > 4000 cars/day |
| 23 | 25 | Villages > 1 000 inh./km$^2$ |
| 24 | 23 | Traffic routes > 2000 cars/day |
| 25 | 24 | 10 km coastal strip |
| 26 | 26 | Remainder not mountainous, not forest |
| 27 | 27 | Remainder |

Once the input parameters have been entered, the user activates a command enabling the computer system (100) according to the invention to start an application continuously. This application, for example in the form of a program executed by the said system (100), will normally consists of firstly taking account of the geographic map (3) corresponding for example to a Department, and then making a selection (71) of a set of contours (4 to 6) on the said map (3) and determining the position of the radio station sites (2) to be installed inside the said contours. For processing of the area illustrated in map (3) as shown in FIG. 1, contours are preselected using the preselection means of the computer system (100) to give priority to processing areas inside contours for which a high target field level was input, in other words for which the greatest marketing advantage was defined. For example, on map (3), the contour (4) belongs to a marketing class defined according to the criterion that the population density is more than 10 000 inhabitants/km$^2$. The other two contours (5 and 6) belonging to a lower marketing class, with a priority order lower than the above-mentioned contour (4), will be processed later.

The application will then analyse each contour (4, 5, 6) and find a determined number of sites to be added (20), always using the same process for validation of new sites illustrated in FIG. 2.

The said process for validation of new sites, applied to the geographic map (3) begins with a step for the selection (71) of the contour (4) that is the most demanding by means of selection means of the computer system (100). It then sets up a regular grid (72) inside the contour (4) selected by using a program module executed by the computer system (100). The grid (72) is made with the spacing input as a parameter. Usually, the size of this spacing varies depending on the selected contour (4) class. The grid spacing for the contours (4 to 6) on the geographic map (3) may always be the same as illustrated in FIG. 1, but in one advantageous embodiment of the invention, the spacing of the grid for the most demanding contour (4) will be smaller than the others.

Potential sites (31) are positioned depending on the grid (72) produced. This grid (72) is preferably hexagonal, with regular hexagons (30) with side (R). Advantageously, if the contour (4) does not correspond to a traffic route (8), the potential sites (31) are tri-sectorial and are located at the intersection of three grid elements, each grid element being diagrammatically represented by a hexagon (30). These tri-sectorial sites (31) are located at the centre of a polygonal zone (21) called the site contour, formed from three regular hexagons (30). Potential sites for a contour corresponding to a traffic route (8) are bi-sectorial, uniformly distributed along the traffic route (8) and arranged along the direction of the traffic route (8). Naturally, other variants could be envisaged with a different number of sectors in potential sites (31), and therefore with a different site contour (21). These potential sites (31) and their positioning coordinates are temporarily memorised.

Some of the potential sites (31) must be eliminated, and others must be selected as a function of criteria representing their usefulness.

The validation process for new sites continues with a step (73) to sort the most useful sites (20). This is possible because the application includes first fast comparison means that take each potential site (31) in the said regular grid (72) and make a comparison between the reference coverage generated within 15 a disk (D) with a radius equal to three times the side (R) of each hexagon (30) and centred on a potential site (31), and the coverage sufficiency threshold. A potential site (31) placed in a location at which the reference coverage is already quite sufficient will be eliminated in the elimination step (74). This elimination step (74) follows the sort step (3) through first computer system (100) elimination means, firstly so that potential sites for which the reference coverage reaches the said sufficiency threshold can be erased from memory, and secondly so that other sites can be kept. Thus, when the coverage sufficiency threshold has not been reached in the said disk (D), the potential site (31) is kept in the selection of sites and memorised in a memory.

The next step (75) in the process for validation of new sites uses means of producing new radio coverage areas for each added site (20), defining the simulated coverage of an added site (20). These means of setting up new radio coverage areas represent new coverages on a display device of the computer system (100) and memorise the corresponding data. The new coverage inside the contour (4) is estimated using a module in the coverage estimating program of the computer system (100) which in particular uses input parameters related to the type of antenna used and input parameters related to natural or artificial relief. The overlap ratio for each new site coverage is then established in this step (75) using calculation means that add the different overlaps of the same new site coverage and this overlap ratio is memorised for each added site (20). The overlap ratio calculated for a new site (20) then corresponds to the statistical contribution of the site (20) to the global coverage.

A final sort step (76) is then made to restrict the selection of sites to be added (20) in the contour (4) by adding potential sites (31) determined from the first sort (73) for which the contribution ratio is highest, one by one. This final sort (76) must reduce the number of added sites (20) to the strict minimum necessary to reach the coverage threshold fixed by the operator. The application achieves this by using means of sorting added sites (20) as a function of the magnitude of their overlap ratio. The application also comprises second means of comparison for this step between the coverage ratio memorised in the previous step (75) and that takes account of added sites (20), and the minimum coverage ratio or the coverage threshold defined in the configuration file input parameters (11). These second comparison means enable the computer system (100) to eliminate (78) the added site (20) with the greatest overlap ratio, using second site elimination means, since elimination of this site will not reduce the resultant coverage below the said minimum coverage ratio.

Obviously, it would be possible to imagine a different embodiment of the invention with a similar process in which, instead of individually adding the potential sites (31) derived from the first sort (73) with the greatest overlap, the reference coverage could be completed with potential sites (31) with the smallest overlap ratio, and stopping when the minimum coverage ratio is achieved.

The validation process for new sites is terminated with a final selection step (77) of sites to be added (20). The memorisation means of the computer system (100) store data related to coverage modifications made to the processed contour (4).

In some cases, it is possible that there will be an overlap of contours that creates a boundary area (45) located both in a priority contour (4) and also in a contour (5) with a lower class. The said edge area (45) does not cause any specific problem because it will be processed at the same time as the priority contour (4) which is more demanding. Sites belonging to this edge area will be processed again at the same time as the contour (5) without any additional modification compared with the first processing that is more demanding, since the sites added in memory will be marked as being non modifiable. According to another embodiment of the invention, the computer system (100) comprises means of modifying the contours such that an edge area (45) that is included in the contours (4 and 5) of different classes will be considered as belonging only to the contour (4) with the hierarchically highest class.

One of the advantages of the invention is optimisation of the deployment of sites, the number of sites being minimised to satisfy marketing specifications. The possibility of defining parameters for the spacing of the grid (72) enables fine processing with a spacing, for example of only 250 meters for an area to be covered the size of a Department. The invention is thus intended to satisfy the coverage needs of any type of network such as GSM, UMTS, etc.

Another advantage of the invention is due to the fact that the reference coverage is taken into account, so that the results provided will be consistent with the results found in the radio engineering using more sophisticated methods. Furthermore, if necessary depending on circumstances, the selection of sites to be added (20) may be modified quickly by replacing some of the input parameters in the configuration file (11). Therefore the invention makes it possible to simulate several solutions.

It must be obvious for persons skilled in the subject that this invention could be used with many other specific embodiments without going outside the scope of the invention as claimed. Consequently, the embodiments described herein must be considered as being illustrations, but they can be modified within the field defined by the scope of the attached claims, and the invention must not be limited to the details given above.

APPENDIX

Example configuration file

```
dept_shp=cotearmor
district=d22spec
cov_sheet=sport$coverage_perso:cotearmor_co
site_num=221000
Poly_MinThreshold=0.75
Route_MinThreshold=0.80
Site_MinThreshold=0.60
#INFORMATION BY CLASS
Class0=*               #remaining
Class1=A++
Class2=A+
Class3=A++
Class4=A++
Class5=A++
Class6=A+
Class7=A++
Class8=A++
Class9=A++
Class10=A+
Class11=A++
Class12=A++
Class13=A++
Class14=A+
Class15=A++
Class16=A++
Class17=A++
Class18=A++
Class19=A++
Class20=A++
Class21=A+              #route
Class22=A+              #route
Class23=A
Class24=A+              #route
Class25=A+
Class26=A
Class27=B
Class28=*
Class29=*
Class30=*               #unprocessed
```

```
Radius0=1000.0
Radius1=400.0
Radius2=400.0
Radius3=400.0
Radius4=400.0
Radius5=400.0
Radius6=400.0
Radius7=400.0
Radius8=400.0
Radius9=400.0
Radius10=400.0
Radius11=400.0
Radius12=400.0
Radius13=400.0
Radius14=400.0
Radius15=400.0
Radius16=400.0
Radius17=400.0
Radius18=400.0
Radius19=400.0
Radius20=400.0
Radius21=1000.0        #route
Radius22=1000.0        #route
Radius23=400.0
Radius24=1000.0        #route
Radius25=400.0
Radius26=400.0
Radius27=3000.0
Radius28=9000.0
Radius29=9000.0
Radius30=9000.0
#SITE DESCRIPTION
Antenna_Height=30
Antenna_Name=AP907016
Power=12
Attenuation=0
Loss=3.0
```

What is claimed is:

1. Modelling process designed for deployment of the radio coverage of a cellular radiotelephony network, using a computer system that memorises data representing initial radio coverage maps or reference coverage maps of the said cellular radiotelephony network, data representing geographic maps broken down into areas delimited by a contour called geomarketing data, data representing at least one type of radio station, data representing a sufficient coverage threshold and data representing a coverage threshold of each contour, process characterised in that it initially comprises the following successive steps:
   selection of a geographic map by interactive means between the user and the said system,
   retrieval of geomarketing data and data representing the reference coverage map corresponding to the selected geographic map, followed by processing of each contour in turn, using a program executed by the said computer system, this processing taking place as follows:
   if the current coverage is below the contour coverage sufficiency
   threshold, production of a regular grid with a determined spacing showing potential sites representing radio electric stations to be added inside the contour, using calculation means of the said computer system, and particularly using data representing the selected geographic map, each potential site being separated from others by at least a determined distance,
   selection or elimination of potential sites by the said program as a function of at least one criterion related to their usefulness, said computer system using memorised data from a radio propagation attenuation law, data about the type of radio station used and making use of these data to simulate the radio coverage generated by an added site.

2. Process according to claim 1, wherein the said selection or elimination or potential sites is done using the following steps: for each potential site of the said regular grid, comparison between firstly the reference coverage in a disk with a radius equal to the said determined distance and centred on the potential site, and also the coverage sufficiency threshold, and conservation of this site among potential sites if the coverage sufficiency threshold is not reached in the said disk, calculate the radio coverage of each potential site, take each site one by one, and calculate the overlap ratios between sites and the reference coverage, individually add sites that make the greatest contribution to the total coverage, as long as adding the sites does not bring the coverage to a level greater than said coverage threshold fixed for the contour.

3. Process according to claim 1 further comprising a step for definition of several contour classes and grid spacing classes by memory means in the said computer system, the classes being hierarchised, each contour class being assigned a grid spacing with a value that becomes smaller as the class get higher in the hierarchy.

4. Process according to claim 3, wherein the said successive processing of each contour is done in an order determined by the classes hierarchy, the contours in the highest class being processed first, and the contours in the lowest class being processed last.

5. Process according to claim 1, further comprising a step to input the following parameters in at least one configuration file: file name for the said geographic map, file name for the marketing specifications, reference coverage file name, first six-digit number of site starting from which potential site numbers are incremented, minimum coverage ratio for zones that do not correspond to traffic routes, minimum coverage ratio for zones that correspond to traffic routes, coverage sufficiency threshold, value corresponding to the target field level fixed by the operator for each contour class, value of the minimum grid spacing for each contour class, parameters related to the radio station and antenna type used.

6. Process according to claim 5, wherein said parameters related to the type of radio and antenna used include particularly: the antenna height used for the radio station, the name of the antenna used, the power at the emission rack output, expressed in dBW, for the antenna used, the antenna emission attenuation, losses between the emission rack and the antenna expressed in dB.

7. Computer modeling system that will be used for deployment of the radio coverage of a cellular radiotelephony network with data representing initial radio coverage maps or reference coverage maps of the said cellular radiotelephony network, data representing geographic maps broken down into areas delimited by a contour, called geomarketing data, interactive means that the user can use to fix data related to at least one type of radio station in advance, to a coverage sufficiency threshold and to a coverage threshold within each contour, this computer system characterized in that it comprises:
   means of selecting a geographic map, retrieving geomarketing data and data representing the reference coverage map corresponding to the selected geographic map;
   a module, particularly using data representing the selected geographic map making a regular grid with a determined spacing of potential sites representing radioelectic stations to be added inside the contour, each potential site being separated from another site by at least a determined distance;
   comparison means for each potential site in the said regular grid between firstly the reference coverage in a disk with a radius equal to at least the said determined distance and centered on the potential site, and secondly the coverage sufficiency threshold enabling the system to keep this site among the potential sites if the coverage sufficiency threshold is not reached in the said disk;
   means for representing coverages of the kept potential sites, for memorizing data corresponding to these new coverages and means for defining the new coverage in the contour;
   calculation means, taking the sites one by one, to calculate the share of the contribution of different sites to the coverage of the contour;
   means for individually adding potential sites making the largest contribution to the total coverage, as long as adding a site does not bring the coverage to a level greater than the said coverage threshold fixed for the contour, and in that it contains memorized data for a radio propagation attenuation law and data about the type of radio station used, and used these data to simulate the radio coverage generated by the creation of a site.

8. System according to claim 7, comprising memorization means and means for taking account of several contour classes and grid spacings, the classes being hierarchised, each contour class being assigned a grid spacing with a value that becomes smaller as the class gets higher in the hierarchy.

9. System according to claim 8, including means for preselecting contours as a function of their class, particularly enabling the system to follow an order set up by the hierarchy of the said classes for processing of contours, the contours for the highest class being processed first and the contours for the lowest class being processed last.

10. System according to claim 7, in which the contours are divided particularly in two categories: contours of the first category including transport routes, that form long thin polygons, other contours belonging to a second category that form polygons.

11. System according to claim 10, wherein the regular grid of a contour is hexagonal, each potential site containing three sectors and being located at the intersection of three regular hexagons for contours in the said second category.

12. System according to claim 10 wherein the regular grid generated by means of bisectional sites, that are oriented along the direction of the transport route for contours in the said first category.

13. System according to claim 7, further comprising memorization means and means for using at least on file containing geomarketing data, at least one file containing the reference coverage, and at least on configuration file containing all input parameters entered by the user.

* * * * *